US010706722B1

(12) United States Patent
Whelen et al.

(10) Patent No.: US 10,706,722 B1
(45) Date of Patent: Jul. 7, 2020

(54) SYSTEM AND METHOD FOR MAP-BASED GEOFENCING FOR EMERGENCY VEHICLE

(71) Applicant: WHELEN ENGINEERING COMPANY, INC., Chester, CT (US)

(72) Inventors: George Whelen, Old Saybrook, CT (US); Kenneth Lemieux, Groton, CT (US)

(73) Assignee: WHELEN ENGINEERING COMPANY, INC., Chester, CT (US)

( * ) Notice: Subject to any disclaimer, the term of this patent is extended or adjusted under 35 U.S.C. 154(b) by 0 days.

(21) Appl. No.: 16/294,470

(22) Filed: Mar. 6, 2019

(51) Int. Cl.
*G08G 1/0965* (2006.01)
*G08G 1/00* (2006.01)
*H04W 4/90* (2018.01)
*H04W 4/021* (2018.01)

(52) U.S. Cl.
CPC ........... *G08G 1/0965* (2013.01); *G08G 1/207* (2013.01); *H04W 4/022* (2013.01); *H04W 4/90* (2018.02)

(58) Field of Classification Search
CPC .............................. G08G 1/0965; G08G 1/09
See application file for complete search history.

(56) References Cited

U.S. PATENT DOCUMENTS

| | | |
|---|---|---|
| 4,704,610 A | 11/1987 | Smith et al. |
| 6,112,075 A | 8/2000 | Weiser |
| 6,516,273 B1 | 2/2003 | Pierowicz et al. |
| 6,700,504 B1 | 3/2004 | Aslandogan et al. |
| 6,895,332 B2 | 5/2005 | King et al. |
| 6,958,707 B1 | 10/2005 | Siegel |
| 7,046,160 B2 | 5/2006 | Pederson et al. |
| 7,085,637 B2 | 8/2006 | Breed et al. |
| 7,271,736 B2 | 9/2007 | Siegel et al. |
| 7,480,514 B2 | 1/2009 | Karaoguz et al. |
| 7,522,998 B2 | 4/2009 | Hughes |
| 7,663,504 B2 | 2/2010 | Votaw et al. |
| 7,868,783 B2 | 1/2011 | Bachelder |
| 7,884,738 B2 | 2/2011 | Pappas et al. |
| 7,899,621 B2 | 3/2011 | Breed et al. |

(Continued)

FOREIGN PATENT DOCUMENTS

| | | |
|---|---|---|
| CN | 104112348 A | 10/2014 |
| CN | 105857277 A | 8/2016 |

(Continued)

OTHER PUBLICATIONS

Anzilotti, E., Can the Private Sector Help Cities Stop Traffic Deaths?, www.fastcompany.com, World Changing Ideas Newsletter, Jan. 2, 2018.

(Continued)

*Primary Examiner* — Hongmin Fan
(74) *Attorney, Agent, or Firm* — Dilworth IP, LLC

(57) ABSTRACT

A system, method and storage medium for providing an emergency vehicle alert includes first device transmitting EV data including a current location of an EV to a management server, management server receiving the EV data from the first device, the management server determining a geofence for the EV at least based on the received EV data and geographical map data near the EV, and management server transmitting the determined geofence to a second device. The first device is associated with the EV, and the second device is associated with the another vehicle.

20 Claims, 12 Drawing Sheets

(56) References Cited

U.S. PATENT DOCUMENTS

| | | | |
|---|---|---|---|
| 8,094,040 | B1 | 1/2012 | Cornett et al. |
| 8,346,468 | B2 | 1/2013 | Emanuel et al. |
| 8,350,721 | B2 | 1/2013 | Carr |
| 8,487,780 | B2 | 7/2013 | Edwardson |
| 8,552,885 | B2 | 10/2013 | Rijks |
| 8,581,744 | B2 | 11/2013 | Myler |
| 8,593,301 | B2 | 11/2013 | Newman |
| 8,723,680 | B1 | 5/2014 | Baker |
| 8,823,548 | B2 | 9/2014 | Johnson et al. |
| 8,842,021 | B2 | 9/2014 | Behm et al. |
| 8,928,492 | B2 | 1/2015 | Boscacci |
| 8,963,705 | B2 | 2/2015 | Miller et al. |
| 9,053,637 | B2 | 6/2015 | Mawbey et al. |
| 9,254,781 | B2 | 2/2016 | Applebaum |
| 9,278,689 | B1 | 3/2016 | Delp |
| 9,547,986 | B1 | 1/2017 | Curlander et al. |
| 9,738,217 | B1 | 8/2017 | Bradley et al. |
| 9,742,709 | B1 | 8/2017 | Laich |
| 9,756,668 | B2 | 9/2017 | Farrell et al. |
| 9,762,470 | B2 | 9/2017 | Alam et al. |
| 9,786,154 | B1 | 10/2017 | Potter et al. |
| 9,805,430 | B2 | 10/2017 | Miasnik et al. |
| 9,843,913 | B2 | 12/2017 | Dahan et al. |
| 2007/0132608 | A1 | 6/2007 | Votaw et al. |
| 2007/0132609 | A1 | 6/2007 | Stackelhouse |
| 2007/0159354 | A1 | 7/2007 | Rosenberg |
| 2011/0187559 | A1 | 8/2011 | Applebaum et al. |
| 2013/0027221 | A1 | 1/2013 | Johnson et al. |
| 2014/0210643 | A1 | 7/2014 | Baker |
| 2016/0063773 | A1 | 3/2016 | Hatton et al. |
| 2016/0071417 | A1* | 3/2016 | Lewis ............... G08G 1/162 |
| | | | 701/301 |
| 2016/0210858 | A1* | 7/2016 | Foster ............... G08G 1/0965 |
| 2017/0098373 | A1 | 4/2017 | Filley et al. |
| 2017/0105108 | A1 | 4/2017 | South |
| 2017/0187787 | A1 | 6/2017 | Syamala et al. |
| 2017/0192429 | A1 | 7/2017 | Tseng et al. |
| 2017/0332347 | A1 | 11/2017 | Boss et al. |
| 2017/0353892 | A1 | 12/2017 | Elia et al. |
| 2017/0359712 | A1 | 12/2017 | Meredith et al. |

FOREIGN PATENT DOCUMENTS

| | | |
|---|---|---|
| CN | 105894857 A | 8/2016 |
| EP | 2325822 A1 | 5/2011 |
| JP | 2014201181 A | 10/2014 |
| KR | 1020160092965 A | 8/2016 |
| WO | 2015136958 A1 | 9/2015 |
| WO | 2017082756 A1 | 5/2017 |
| WO | 2017200754 A1 | 5/2017 |

OTHER PUBLICATIONS

2018 GovTech 100, Next Wave of Civic Innovation, http://www.govtech.com/100/, Jan. 22, 2018.

HAAS AlertR2V™ (Responder-to-Vehicle) Technology: Enabling Safer, Faster, Emergency Response, HAAS Inc., 2018.

* cited by examiner

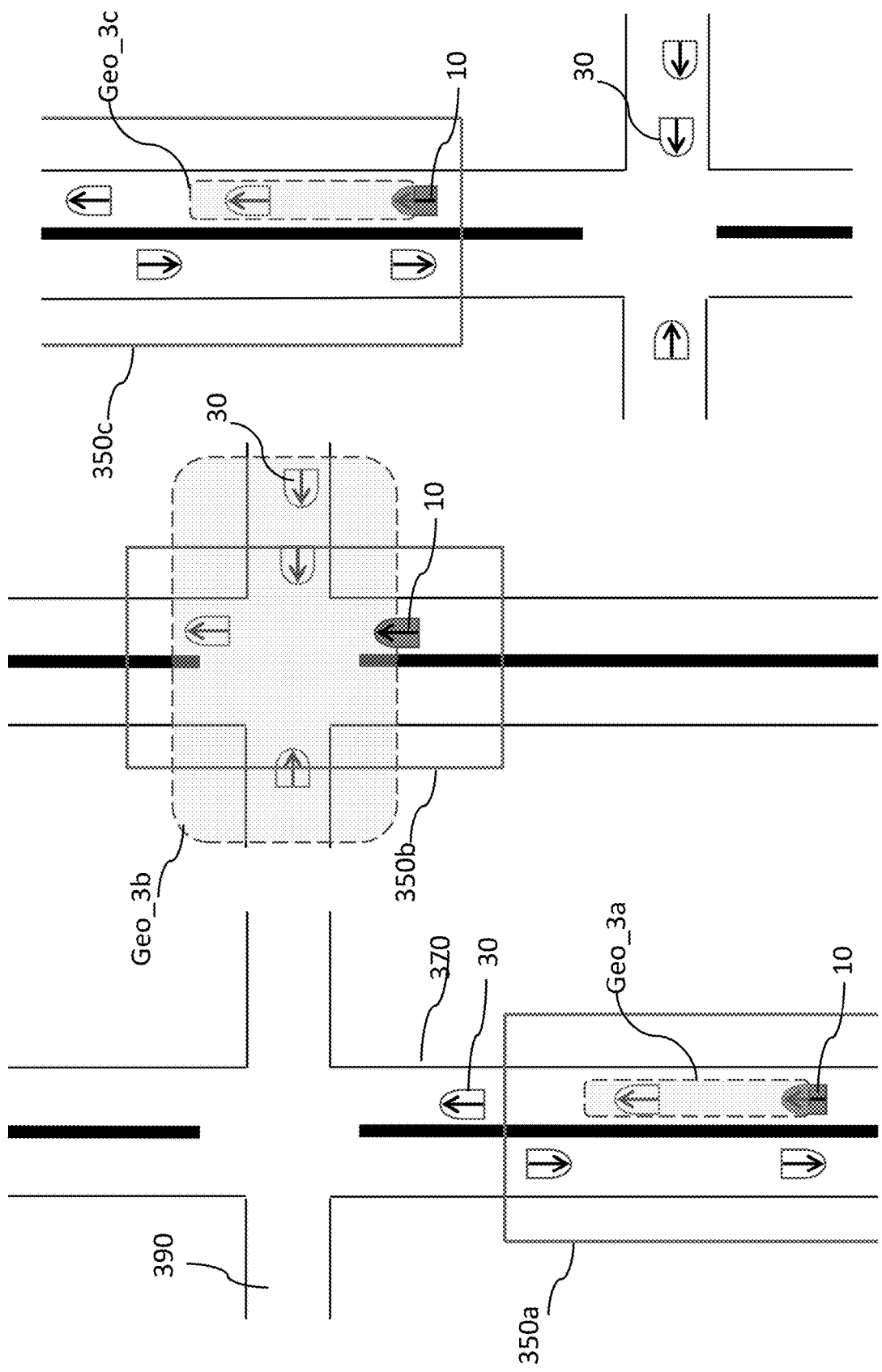

| Vehicle ID 510 | Geofence information 520 | ... |
|---|---|---|

| ... | Vehicle ID 510 | Geofence information 520 | Vehicle type 530 | Alert actions 540 | ... |
|---|---|---|---|---|---|

FIG. 6B

500b

SYSTEM AND METHOD FOR MAP-BASED GEOFENCING FOR EMERGENCY VEHICLE

TECHNICAL FIELD

This application relates to a system or method for effectively providing an emergency vehicle (EV) alert based on a geofence varying depending on a location of the EV projected on a map.

BACKGROUND

When emergency situations such as occurrences of disasters, car accidents, crimes, etc. take place, it is not only critical to send emergency responders to emergency scenes promptly and efficiently to provide rescue efforts to the people involved in the emergency event, but it is also important to guarantee the safety of emergency vehicles (EVs) heading to the emergency scene.

Widely used means to guarantee the safety of EVs includes providing direct emergency vehicle alerts based on conventional audio or visual signaling devices such as flashing lights, sirens and/or horns. However, these conventional signaling devices may not be adequate, or may provide unnecessary alerts to vehicles which are not even on roads that the EV can travel. These alerts may also easily be ignored by people, or go unnoticed by people with hearing impairments or by distracted drivers.

Regarding these issues, U.S. patent application Ser. No. 15/958,550 discloses a method for generating a safety zone based on node data collected from emergency equipment and giving warning messages to other vehicles when they approach near the zone, the entire disclosure of which are incorporated by reference herein.

However, there has been no prior work on determining or varying a size or shape of a geofence for an EV based on a location of the EV and map information near the EV.

SUMMARY OF THE INVENTION

Aspects of the present disclosure are a system, method and storage medium for providing an emergency vehicle alert to other vehicles based a geofence varying in size or shape depending on a location of the EV and map information near the EV.

In one aspect, there is provided a system for providing an emergency vehicle (EV) alert. The system includes a first device associated with the EV, a management server, and a second device. The first device is configured to transmit EV data including a current location of the EV to the management server. The management server is configured to receive the EV data from the first device, determine a geofence for the EV at least based on the received EV data and geographical map data near the EV, and transmit the determined geofence to the second device. The second device is associated with another vehicle.

In one embodiment, the second device may be configured to receive the geofence, determine a location of the another vehicle with respect to the geofence, and perform one or more alert actions based on the determined location of the another vehicle with respect to the received geofence.

In one embodiment, the management server may include a processor, and to determine the geofence, the processor may be configured to receive the geographical map data from a storage device, define at least one zone on a map rendered using the geographical map data, determine a zone, among the at least one zone, to which the current location of the EV belongs, and determine the geofence based on the determined zone on the map.

In one embodiment, the storage device may be included or locally connected to the management server, or may be installed at a remote location in communication with the management server.

In one embodiment, the at least one zone may include a first zone and a second zone separated in a forward direction of the EV, and the first zone and the second zone may separately be defined at least based on whether a road on which the EV travels has a median strip.

In one embodiment, when the road has the median strip, in the first zone with the median strip, the determined geofence may be defined to exclude one or more opposite lanes over the median strip, and in the second zone without the median strip, the determined geofence may be defined to include the opposite lanes.

In one embodiment, the at least one zone may include a first zone and a second zone separated along with a forward direction, and the first zone and the second zone may separately be defined at least based on whether there is at least one another road allowing a vehicle traffic flow into or from a road on which the EV travels.

In one embodiment, in the first zone where there is no at least one another road allowing the vehicle traffic flow into or from the road, the determined geofence may be defined to have a first size, and in the second zone where there is the at least one another road allowing the vehicle traffic flow in or from the road, the determined geofence is defined to have a second size in a perpendicular direction to a forward direction of the EV greater than the first size, and wherein the second size may be such that the geofence covers a portion of the at least one another road.

In one embodiment, the at least one another road may include at least one of an interchange, a ramp and an intersection ahead of the EV.

In one embodiment, the management server may be configured to determine the geofence further based on a moving direction of the vehicle.

In one embodiment, when the determined zone includes an underpass or overpass crossing a road on which the EV travels, the determined geofence may be defined to exclude the underpass or overpass.

In one embodiment, when the determined zone includes a parallel lane isolated from a lane on which the EV travels, the determined geofence may be defined to exclude the isolated parallel lane.

In another aspect of the present disclosure, there is provided a system for providing an emergency vehicle (EV) alert. The system includes a receiver, a processor and a transmitter. The receiver is configured to receive EV data from a first device associated with the EV. The processor is configured to determine a geofence for the EV at least based on the received EV data and geographical map data near the EV. The transmitter is configured to transmit the determined geofence to a second device associated with another vehicle. The EV data includes a current location of the first device.

In still another aspect of the present disclosure, there is provided a method for providing an emergency vehicle (EV) alert. The method includes transmitting, by a first device, EV data including a current location of an EV to a management server, the first device being associated with the EV; receiving, by the management server, the EV data from the first device; determine, by the management server, a geofence for the EV at least based on the received EV data and geographical map data near the EV; and transmitting, by the management server, the determined geofence to a second device which is associated with another vehicle.

In still yet another aspect of the present disclosure, there is provided a method for providing an emergency vehicle (EV) alert. The method includes receiving, by a receiver, EV data from a first device associated with the EV, the EV data including a current location of the first device; determining, by a processor, a geofence for the EV at least based on the received EV data and geographical map data near the EV; and transmitting, by a transmitter, the determined geofence to a second device which is associated with another vehicle.

In still yet another aspect of the present disclosure, there is provided a computer-readable storage medium having computer readable program instructions. The computer readable program instructions read and executed by at least one processor for performing a method for providing an emergency vehicle alert. The method includes receiving, using a receiver, EV data from a first device which is associated with the EV, the EV data including a current location of the first device; determining a geofence for the EV at least based on the received EV data and geographical map data near the EV; and transmitting, using a transmitter, the determined geofence to a second device which is associated with another vehicle.

BRIEF DESCRIPTION OF THE DRAWINGS

The present disclosure will become more readily apparent from the specific description accompanied by the drawings.

FIGS. 3A-3C depict an example scenario where an EV passes through an intersection, according to an exemplary embodiment of the present disclosure;

FIG. 6A depicts an example safety warning signal generated by a remote management server and transmitted to a subscriber device of each of other vehicles according to an exemplary embodiment of the present disclosure;

FIG. 6B depicts an example safety warning signal generated by a remote management server and transmitted to a subscriber device of each of other vehicles according to an exemplary embodiment of the present disclosure;

DETAILED DESCRIPTION

The present disclosure may be understood more readily by reference to the following detailed description of the disclosure taken in connection with the accompanying drawing figures, which form a part of this disclosure. It is to be understood that this disclosure is not limited to the specific devices, methods, conditions or parameters described and/or shown herein, and that the terminology used herein is for the purpose of describing particular embodiments by way of example only and is not intended to be limiting of the claimed disclosure.

Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "Geofence" of an emergency vehicle (EV) is defined as a boundary of a safety alert zone where other one or more vehicles in the vicinity of the EV are alerted to the presence of the EV. Thus, it can be appreciated that a zone encompassed by the geofence can be a safety alert zone. Further, "Geofencing" for an EV can be understood as generating the safety alert zone for the EV.

Figure 1:
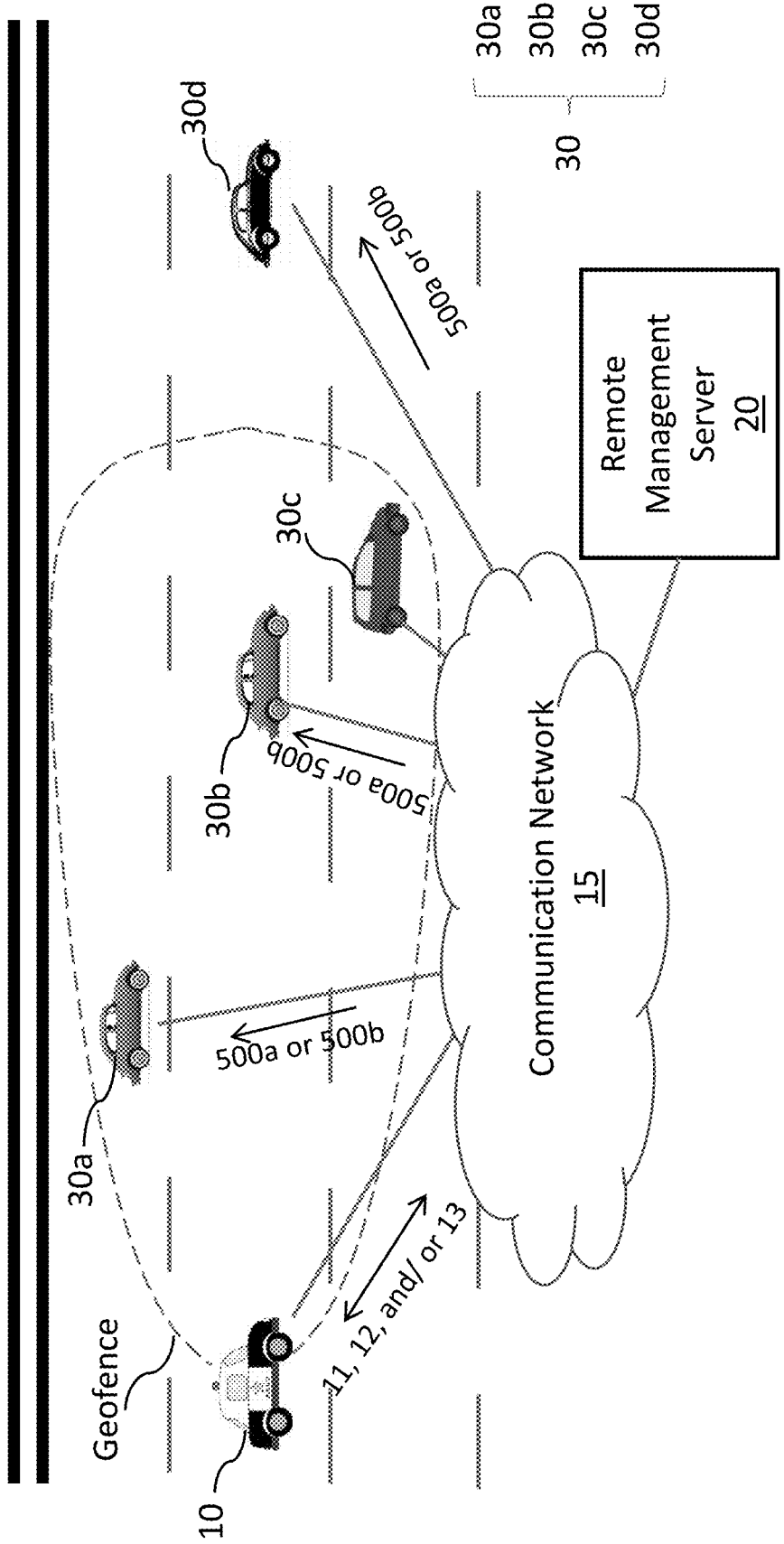
FIG. 1 depicts an example environment where an EV alert management network is operated according to an exemplary embodiment of the present disclosure.

FIG. 1 depicts an example environment where an EV alert management network is operated according to an exemplary embodiment of the present disclosure.

Referring now to FIG. 1, an EV 10 communicates with a remote management server 20 through a communication network 15 for exchanging EV-related data 11, an emergency indication signal 12, an emergency state release signal 13 and/or the like, and the remote management server 20 communicates with each of other vehicles 30a to 30d which travel on roads nearby the EV 10.

Figure 2A:
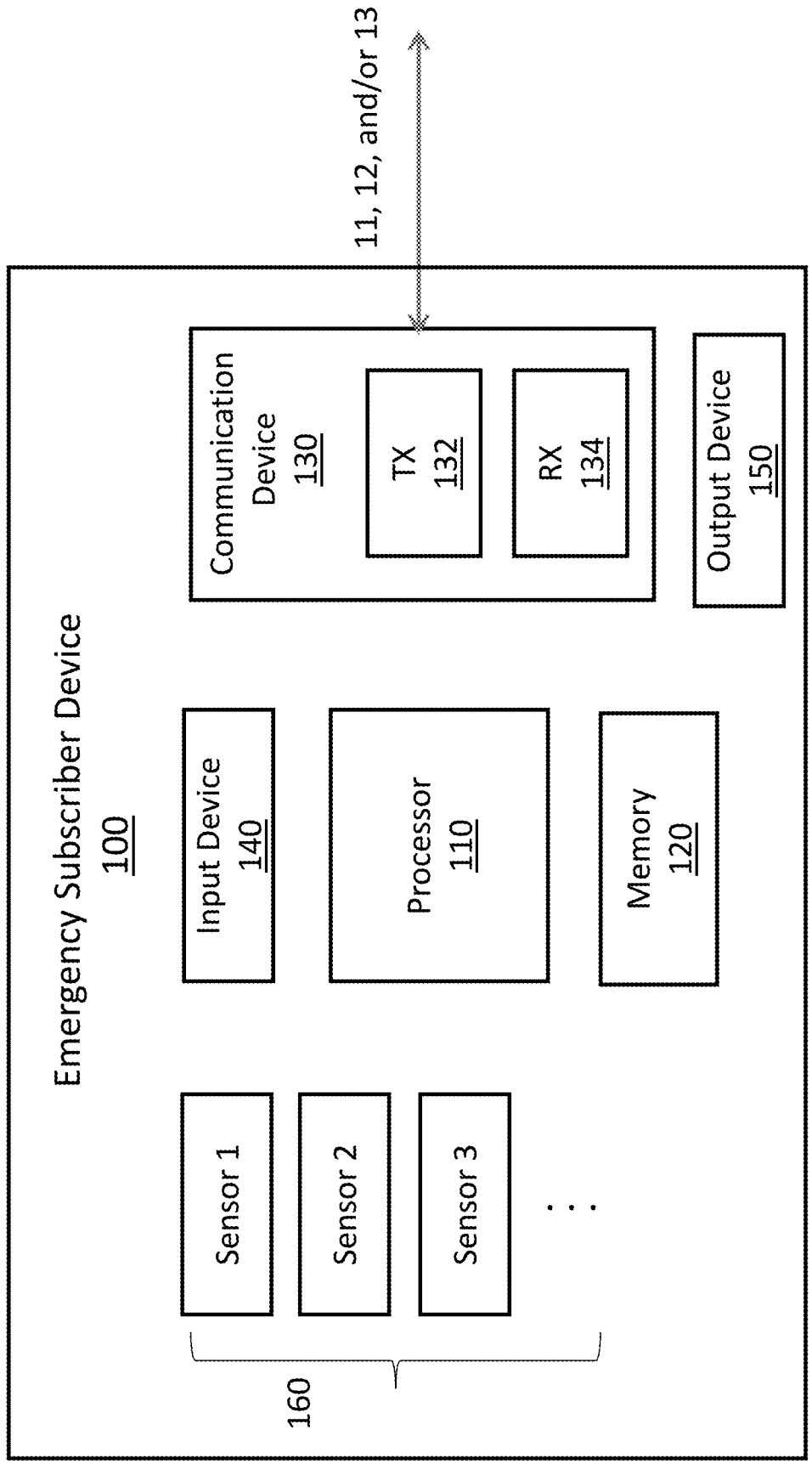
FIG. 2A depicts a block diagram of an emergency subscriber device according to an exemplary embodiment of the present disclosure.
Figure 2B:
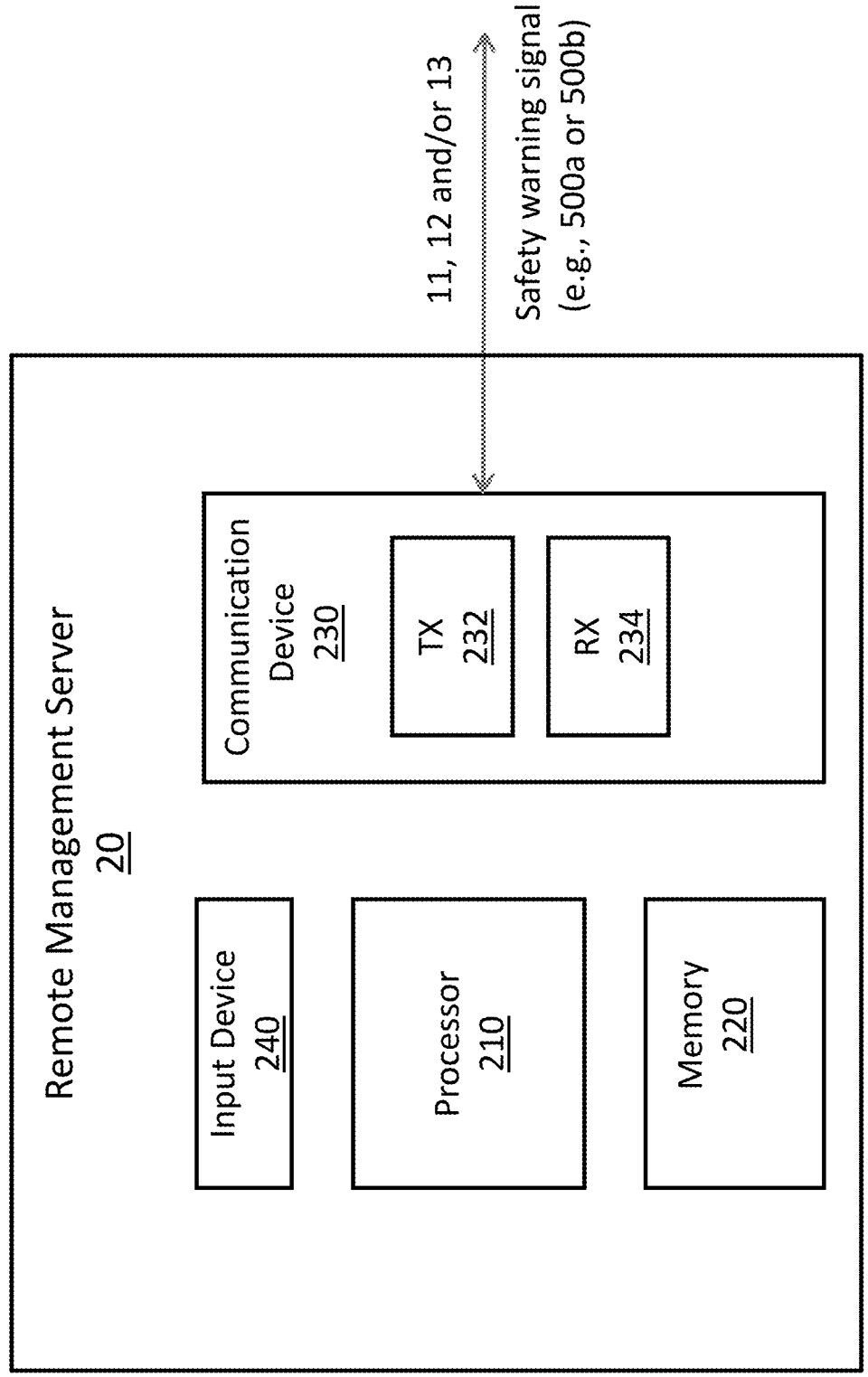
FIG. 2B depicts a block diagram of a remote management server according to an exemplary embodiment of the present disclosure.
Figure 2C:
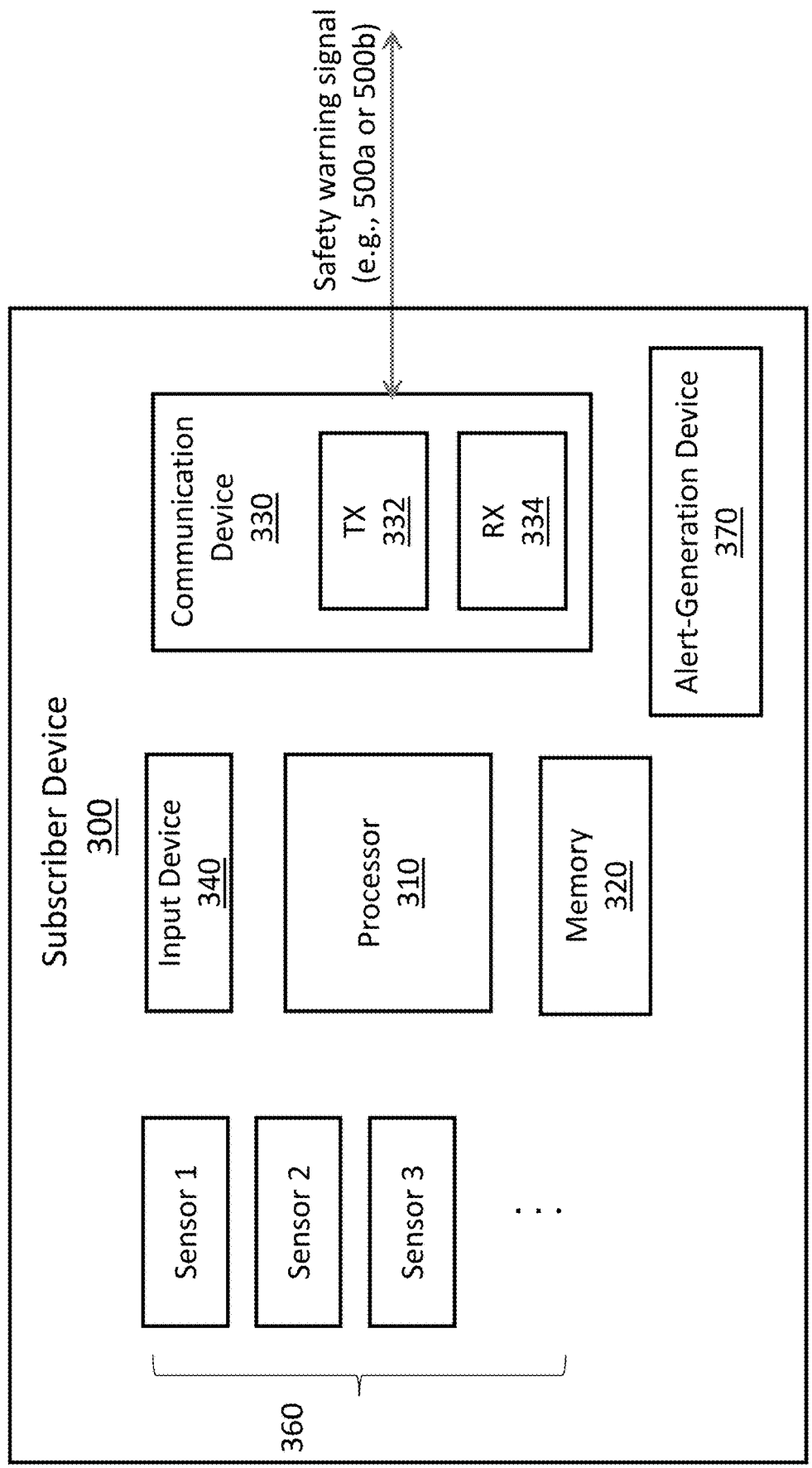
FIG. 2C depicts a block diagram of a subscriber device receiving an EV alert from the remote management server according to an exemplary embodiment of the present disclosure.

FIG. 2A depicts a block diagram of an emergency subscriber device 100 according to an exemplary embodiment of the present disclosure. FIG. 2B depicts a block diagram of a remote management server 20 according to an exemplary embodiment of the present disclosure. FIG. 2C depicts a block diagram of a subscriber device 300 receiving an EV alert from the remote management server 20 according to an exemplary embodiment of the present disclosure.

In one embodiment, the emergency subscriber device 100 can be associated with the EV 10. For example, the emergency subscriber device 100 can be installed as a part of the EV 10, or a wearable, or portable (hand held) device attached to the EV 10. Similarly, in one embodiment, the subscriber device 300 can be associated with each vehicle 30a to 30d. For example, the subscriber device 300 can be installed as a part of each vehicle 30a to 30d, or a wearable or portable (hand held) device attached to the vehicle.

Referring particularly to FIG. 2A, the emergency subscriber device 100 includes a processor 110, a memory 120, an input device 140, an output device 150, a communication device 130 and one or more sensor devices 160.

When the EV 10 is in an emergency state where it heads to an emergency scene, the emergency subscriber device 100 triggers an emergency state and transmits an emergency indication signal 12 to the remote management server 20 using the transmitter 132. The emergency indication signal 12 indicates that the EV is in an emergency state, and upon receiving the emergency indication signal 12, the remote management server 20 can perform one or more safety actions to provide an alert of the EV 10 to other vehicles 30a to 30d traveling on roads nearby the EV 10. The safety actions may include: determining a geofence, generating a safety warning signal (e.g., 500a of FIG. 3A or 500b of FIG. 3B) based on the determined geofence; and transmitting the safety warning signal to the other vehicles 30a to 30d nearby the EV 10, more details of which will be described later. The emergency indication signal 12 may include an ID of the EV, and optionally, various EV-related data such as a type of the EV, a location of the EV, a moving direction of the EV, a velocity of the EV, or the like.

By way of example, the emergency state can automatically be triggered when flashing lights, sirens and/or horns of the EV 10 are activated. However, exemplary embodiments of the present disclosure are not limited thereto.

In some examples, the EV-related data 11 can be incorporated into the emergency indication signal 12, or can separately be transmitted from the emergency indication signal 12. In further examples, the EV-related data 11 can be transmitted only upon the transmission of the emergency indication signal 12, or can be transmitted regardless thereof.

In addition, the sensor devices 160 collects the EV-related data 11. For example, the sensor data such as the location, the moving direction, and the velocity can be collected using sensor devices 160 including, but are not limited to: an accelerometer, a global positioning system (GPS) receiver, a velocity sensor, a motion sensor, infrared light sensors, radar, laser radar, cameras, a gyroscope, or the like. The collected EV-related data 11 may be stored in the memory 120 or other storage (not shown).

In addition, the memory 120 includes program instructions executable by the processor 110 to perform functions or operations of the emergency subscriber device 100 described in the present disclosure. The processor 110 reads the stored data which have been collected from the sensor devices 160 and processes to generate messages that will be transmitted to the remote management server 20 through the transmitter 132 of the communication device 130. In one embodiment, the receiver 134 of the communication device 130 can be used to receive a control or confirmation signal from the remote management server 20.

The communication network 15 may be implemented using on a wireless communication technique based on radio-frequency identification (RFID), code division multiple access (CDMA), global system for mobile communication (GSM), wideband CDMA, CDMA-2000, time division multiple access (TDMA), long term evolution (LTE), wireless LAN, Bluetooth, or the like. The communication device 130 may be implemented to support at least one of the above-mentioned communication techniques.

The input device 140 can be, but is not limited to: a keyboard, a touch screen, an audio input system, a voice recognition system, or the like. The output device 150 can be, but is not limited to: a screen, a speaker, a light, a siren, a visual system, an audio system, or the like.

Referring further to FIG. 2B, the remote management server 20 includes a processor 210, a memory 220, a communication device 230, and an input device 240. The remote management server 20 may reside on a network infrastructure or on a third-party service provider, such as a cloud storage and computing system. The remote management server 20 receives the EV-related data 11 using a receiver 234 of the communication device 230 transmitted over the communication network 15 and store the data 11 into the memory 220.

The communication device 230 includes a transmitter 232 and the receiver 234. The communication device 230 may be implemented to support at least one of the above-mentioned communication techniques such as RFID, CDMA, GSM, wideband CDMA, CDMA-2000, TDMA, LTE, wireless LAN, Bluetooth, or the like. The input device 240 can be, but is not limited to: a keyboard, a touch screen, an audio input system, a voice recognition system, or the like.

Upon receiving the emergency indication signal 12 from the EV 10, the processor 210 determines a geofence for the EV based on the EV-related data 11 (e.g., based on a location of the EV 10 and/or a moving direction of the EV 10) and geographical map data near the EV 10, and generates the safety warning signal based on the geofence. The remote management server 20 transmits the generated safety warning signal to the subscriber device 300 of each vehicle 30 traveling on roads nearby the EV 10 using the transmitter 232. The subscriber device 300 receives the safety warning signal including the geofence, performs one or more alert actions in response to determining that a location of each vehicle 30 is within the geofence, and performs no alert action in response to determining that the location of each vehicle 30 is out of the geofence.

FIGS. 3A-3C depict an example scenario where an EV 10 passes through an intersection, according to an exemplary embodiment of the present disclosure.

Referring now to FIGS. 3A to 3C, the EV 10 travels on a road 370, passing through a plurality of zones 350a to 350c. The plurality of zones 350a to 350c can be defined on a geographical map from a certain storage device. In one embodiment, the processor 210 receives the geographical map data from a storage device (e.g., the memory 220 or a storage device installed at a remote location in communication with the remote management server 20) and defines the plurality of zones on the map rendered using the geographical map data.

In defining the plurality of zones, the type of a road 370 on which the EV 10 travels and/or the way or shape of the road 370 of being connected with other roads (e.g., 390 of FIGS. 3A-3C; and 490a and 490b of FIGS. 4A and 4B) can be considered. In other words, the plurality of zones can separately be defined at least based on the type of the road 370 or the way or shape of the road 370 of being connected with other roads. For example, referring particularly to FIG. 3A, when the EV 10 travels in the zone 350a where there is no other road, such as entrance ramps, interchanges, intersections, or the like, connected to the road 370, there will be no traffic flow into the road 370, and thus the processor 210 determines a geofence Geo_3a, for the EV 10, which covers the road 370 on which the EV 10 travels. Further, referring to FIG. 3B, when the EV 10 enters the zone 350b (e.g., intersection zone) containing an intersection between the road 370 and a side road 390, there may be vehicle traffic flows through the road 390, and thus the processor 210 determines a geofence Geo_3b which extends to cover a portion of the road 390, thus providing an EV alert to vehicles on the road 390. In this case, a size of the geofence Geo_3b of FIG. 3B can be bigger than that of the geofence Geo_3a of FIG. 3A. Still further, referring to FIG. 3C, when the EV 10 gets out of the zone 350b and travels in the zone 350c where there is no traffic flow toward the road 370 as is the zone 350a of FIG. 3A, the processor 210 determines a geofence Geo_3c which is substantially the same or at least smaller in size than the geofence Geo_3b.

The processor 210 determines as to which zone the EV 10 is located in based on the location of the EV 10 which is transmitted from the emergency subscriber device 100 of the EV 10.

Figure 4B:
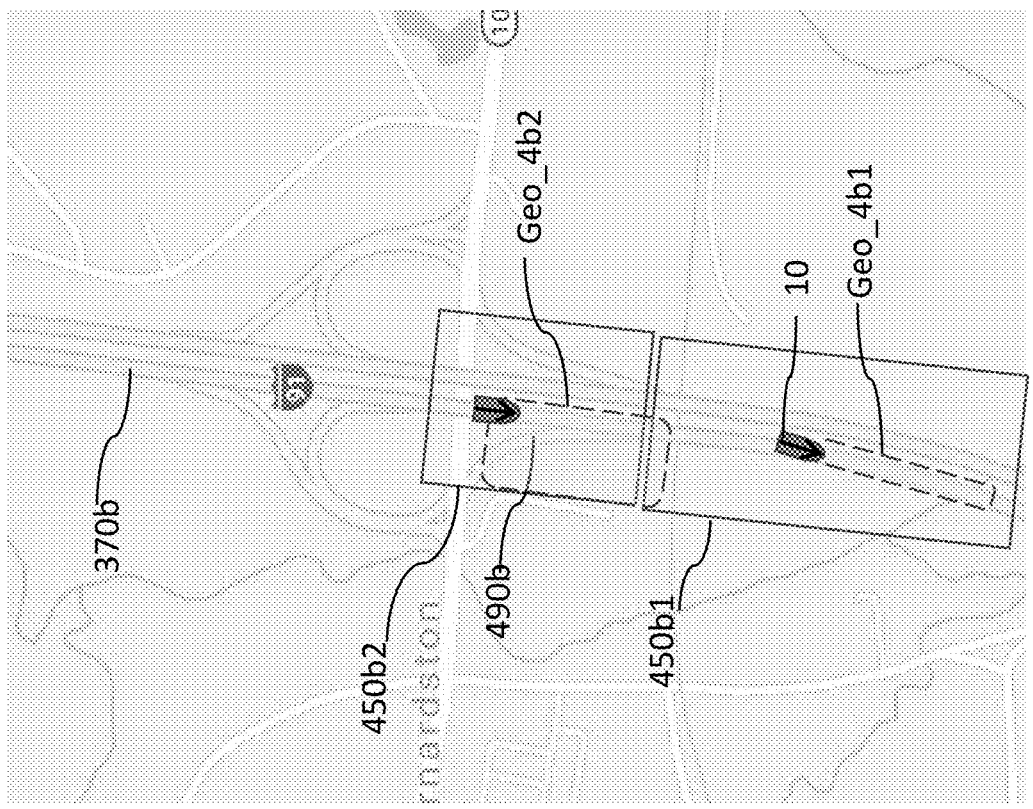
FIGS. 4A and 4B depict example scenarios where an EV passes through a zone containing an entrance ramp, according to an exemplary embodiment of the present disclosure.
Figure 4A:
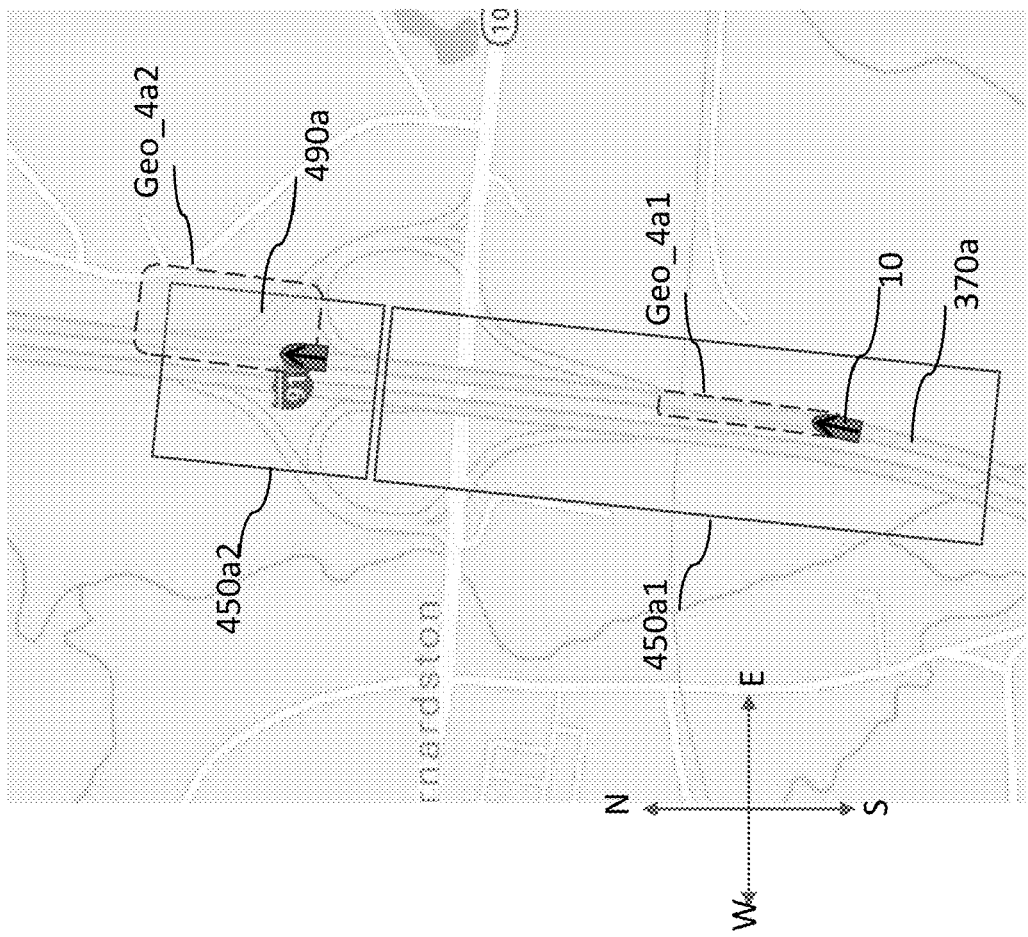

FIGS. 4A and 4B depict example scenarios where the EV 10 passes through a zone containing an entrance ramp, according to an exemplary embodiment of the present disclosure.

Referring to FIG. 4A, the EV 10 travels northbound on a road 370a from a zone 450a1 to a zone 450a2. The zone 450a1 in the northbound traffic does not contain any other roads connected to the road 370a that allow vehicles to flow in the road 370a. Further, the zone 450a2 contains an entrance ramp 490a through which vehicles can flow into the road 370a on which the EV 10 travels. In this circumstance, the processor 210 defines at least two zones 450a1 and 450a2 on the map for the EV 10 traveling northbound. When the EV 10 is located in the zone 450a1, the processor 210 determines a geofence Geo_4a1 which covers the road 370a on which the EV 10 travels. When the EV 10 enters the zone 450a2, the processor 210 determines a geofence Geo_4a2 which extends to cover a portion of the ramp 490a, thus providing an EV alert to vehicles on the ramp 490a. In this case, a size of the geofence Geo_4a2 can be bigger than that of the geofence Geo_4a1 in a perpendicular direction to the forward direction of the EV 10.

Further, referring to FIG. 4B, the EV 10 travels southbound along a road 370b from a zone 450b2 to a zone 450b1. The zone 450b2 contains an entrance ramp 490b through which vehicles can flow into the road 370b that the EV 10 travels. The zone 450b1 in the southbound traffic does not contain any other roads connected to the road 370b that allow vehicles to flow in the road 370b. In this circumstance, the processor 210 defines at least two zones 450b1 and 450b2 on the map for the EV 10 travels southbound. When the EV 10 enters the zone 450b2, the processor 210 determines a geofence Geo_4b2 which extends to cover a portion of the ramp 490b, thus providing an EV alert to vehicles on the ramp 490b. When the EV 10 enters the zone 450b1, the processor 210 determines a geofence Geo_4b1 which covers the road 370a on which the EV 10 travels. In this case, a size of the geofence Geo_4b2 can be bigger than that of the geofence Geo_4b1 in a perpendicular direction to the forward direction of the EV 10. It will be appreciated that the way of defining zones on the map can be different depending on the moving direction (e.g., northbound or southbound of the EV 10), and corresponding shape or size of geofences to be determined by the processor 210 can be different even if the EV 10 is determined to be in the same zone. For example, the processor 210 may consider a moving direction of the EV 10 when it defines a plurality of zones on the map and/or determines a geofence for the EV 10.

Figure 5B:
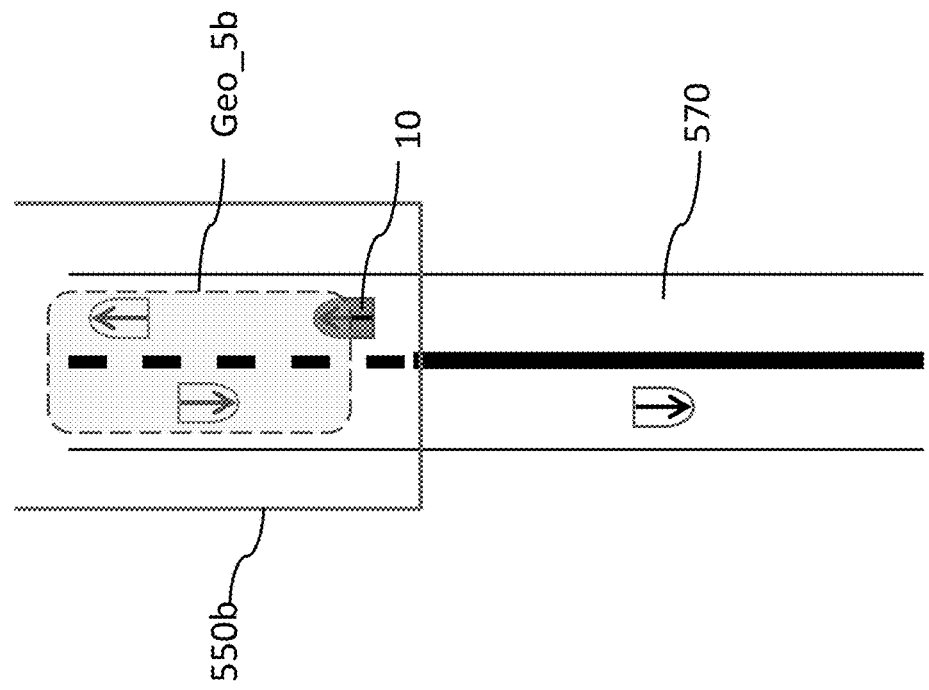
FIGS. 5A and 5B depict another example scenario where the type of a road on which an EV travels varies according to an exemplary embodiment of the present disclosure.
Figure 5A:
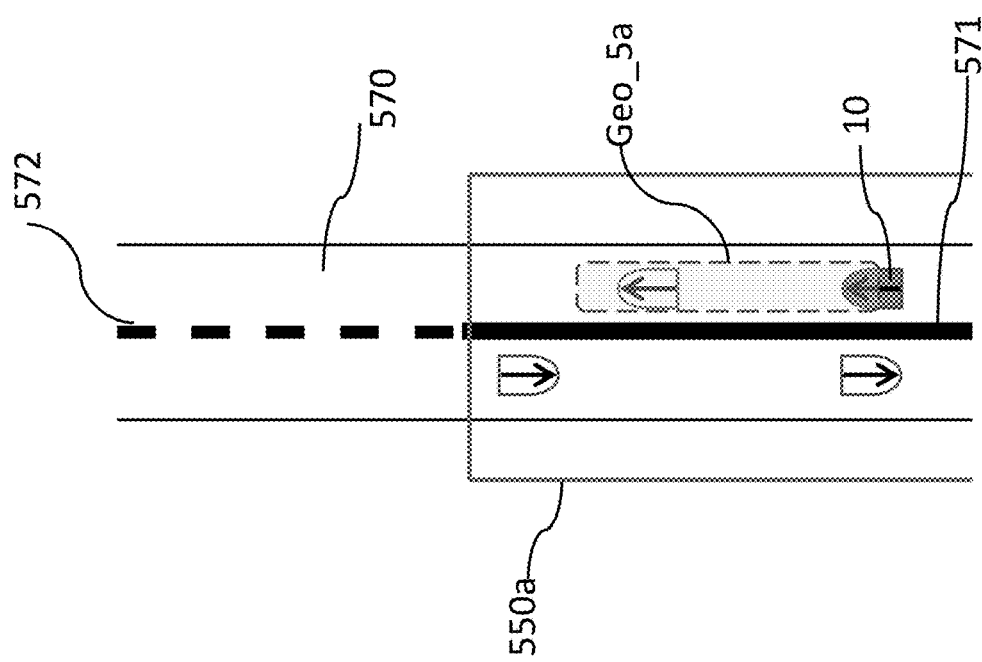

FIGS. 5A and 5B depict another example scenario where the type of a road 370 along which the EV 10 travels varies according to an exemplary embodiment of the present disclosure.

Referring to FIGS. 5A and 5B, the EV 10 travels on the road 570 from a zone 550a to a zone 550b. In the zone 550a, the road 570 has a type where both way traffics are separated by a structure such as a median strip, a central reservation, or the like, thus in this case (e.g., when the EV 10 is located in the zone 550a), the processor 210 may determine a geofence Geo 5a which only covers lanes in the same direction as the EV 10 and excludes opposite lanes to the EV 10, thus avoiding unnecessary EV alert to vehicles which do not affect the safety of the EV 10. Further, when the EV 10 enters the zone 550b where there is no separating structure, so vehicles in the opposite lanes can possibly get into the travel path of the EV 10, the processor 210 may determine a geofence Geo 5b which covers the opposing lanes as well as the lanes in the same direction, as shown in FIG. 5B.

In addition, by way of example only, the EV 10 may travel on a road including an underpass or overpass crossing the road. It is noted that traffics on the underpass or overpass may not affect the safety of the EV 10. Thus, in order to avoid unnecessary EV alert to vehicles traveling the underpass or overpass, in a zone having the underpass or overpass, the processor 210 may determine a geofence which only covers the road where the EV 10 travels and excludes the underpass or overpass.

Further, by way of example only, if the road where the EV 10 travels includes parallel lanes isolated from each other. Thus, in order to avoid unnecessary EV alert to vehicles on the other isolated parallel lanes than a lane where the EV 10 travels, the processor 210 may determine a geofence which only covers the lane where the EV 10 travels and excludes the other isolated parallel lanes.

In one embodiment, the memory 220 may include information of geofences which are respectively appropriate to respective velocities of the EV, respective types of the EV and/or a combination thereof. The processor reads out a corresponding geofence from the memory 220 based on the velocity and/or the type of the EV.

Referring back to FIG. 2C, the subscriber device 300 includes a processor 310, a memory 320, a communication device 330, an input device 340, and an alert-generation device 370. Each vehicle 30a to 30d may be a vehicle registered for services that provide emergency vehicle alerts, so that at least one of the above components thereof is designed to have features for receiving the emergency vehicle alerts.

For example, the communication device 330 includes a transmitter 332 and a receiver 334 which are implemented to support at least one of the above-mentioned communication techniques being capable of communicating with the communication device 230 of the remote management server 20 and/or the communication device 130 of the EV 10.

The safety warning signal received through the receiver 334 may be stored in the memory 320. The processor 310 may retrieve a geofence for the EV 10 based on the safety warning signal, determine whether the vehicle is located within the geofence or not, and determine whether to perform one or more alert actions based on whether the vehicle is located within the geofence.

It should also be appreciated that shapes of the geofences are not limited to what are illustrated in the figures of the present disclosure. For example, example shapes of geofences are also described in Applicant's copending U.S. patent application Ser. No. 16/243,692 filed on Jan. 9, 2019, entitled "SYSTEM AND METHOD FOR VELOCITY-BASED GEOFENCING FOR EMERGENCY VEHICLE", the entire disclosure of which is incorporated by reference herein.

FIGS. 6A and 6B are example safety warning signals generated by a remote management server and transmitted to a subscriber device of each of other vehicles according to exemplary embodiments of the present disclosure.

In one embodiment, referring now to FIG. 6A, illustrated is an example safety warning signal 500a generated by the processor 210 of the remote management server 20 and transmitted to the subscriber device 300 of each vehicle 30a to 30d. The safety warning signal 500a includes, but is not limited to: an EV ID 510 and geofence information 520 related to the EV ID 510. The geofence information 520 can be any information used for identifying directly or indirectly features (e.g., size or shape) of the geofence for the EV 10.

Referring now to FIG. 6B, illustrated is another example safety warning signal 500b that further includes an EV type 530 and one or more alert actions 540 for each vehicle 30a to 30d to follow when a certain condition is met. The certain condition may include that a current location of each vehicle 30a to 30d is matched to a geofence defined by the geofence information.

In one embodiment, the safety warning signal 500a and/or 500b is a broadcast signal transmitted over a wireless channel to one or more predetermined regions near the EV 10.

In one embodiment, the geofence information 520 is directly provided as a set of location coordinates corresponding to a boundary of the determined geofence.

In another embodiment, the geofence information 520 is indirectly provided as an indication (e.g., geofence function G(x)) that can be used by the subscriber device 300 to retrieve the geofence from the geofence information 520, more details of which will be described with reference to FIG. 2C. When the geofence information 520 is indirectly provided as an indication that can be used by the subscriber device 300, a current location of the EV 10 may be provided in the safety warning signal 500a and/or safety warning signal 500b, so that the subscriber device 300 can combine the EV current location to generate a more exact geofence defined around the EV 10, and/or the subscriber device 300 tracks of the EV 10's movement based on the EV current location and displays on a visual system thereof. By way of example, the indication can be an index identifying a specific geofence, and information regarding relationships between the indices and their respective mapping geofences can be prestored in the memory 320 of the subscriber device 300, so that the subscriber device 300 can read out an appropriate geofence based on the index.

Referring back to FIG. 2B, in one embodiment, the processor 210 of the remote management server 20 may further generate a confirmation signal (not shown) to transmit it back to the EV 10 when, before, and/or after the safety warning signal 500a or 500b is transmitted to the vehicles 30a to 30d, so that the EV 10 may recognize that the emergency state thereof has been transferred to the remote management server 20 and the safety action for the EV 10 has started. In some examples, the safety warning signal 500a or 500b is transmitted to the subscriber device 300 of each vehicle 30a to 30d, and the processor 310 of the subscriber device 300 processes the geofence information 520 of the safety warning signal 500a or 500b to display the geofence through a display of the alert-generation device 370 of the subscriber device 300.

In one embodiment, if the geofence information 520 is provided as a set of location coordinates corresponding to a boundary of the determined geofence, the processor 310 of the subscriber device 300 determines whether a current location of the corresponding vehicle is matched to the geofence of the EV 10 based on the set of location coordinates in the geofence information 520. For example, if the current location of each vehicle 30a to 30d is within the boundary defined by the set of location coordinates, the processor 310 determines a match between the vehicle current location and the geofence; otherwise, it determines a mismatch therebetween. If the match is found between the current location and the geofence, the processor 310 controls the alert-generation device 370 to perform one or more alert actions; otherwise (e.g., if no match is found therebetween), the processor 310 discards the safety warning signal 500a or 500b and performs no further action for providing the EV alert.

In one embodiment, if the geofence information 520 is provided as an indication for geofence (e.g., geofence function G(x)) as discussed above, the processor 310 further retrieves the geofence based on the geofence information 520 (e.g., based on the geofence function G(x)), and then determines whether the vehicle current location is located within the geofence or not. If a match is found between the current location and the geofence, the processor 310 controls the alert-generation device 370 to perform one or more alert actions; otherwise (e.g., if no match is found therebetween) the processor 310 discards the safety warning signal 500a or 500b and performs no further action for providing the EV alert.

In one embodiment, the alert-generation device 370 is configured to perform alert actions under control of the processor 310. The alert-generation device 370 can be, but is not limited to: a screen, a speaker, a light, a siren, a visual system, an audio system, or the like. The input device 340 can be, but is not limited to: a keyboard, a touch screen, an audio input system, a voice recognition system, or the like. The current location can be collected using the sensor devices 360 such as a positioning device, as shown in FIG. 2C.

In one embodiment, the alert actions include generating a visual and/or audible warning signal for a driver to recognize an EV alert for next safety actions such as yielding for the EV to let the EV safely pass.

In one embodiment, the alert actions are preprogrammed and stored in the memory 320 of the subscriber device 300, and when a match is found between the current location and the geofence, the processor 310 reads the alert actions from the memory 320 to control the alert-generation device 370 to perform the alert actions.

In one embodiment, the alert actions are transferred from the remote management server 20 to the subscriber device 300 of each vehicle 30a to 30d through the alert action information field 540 in the safety warning signal 500b, as depicted in FIG. 6B. In this case, the processor 310 controls the alert-generation device 370 to perform the alert actions, as instructed in the alert action information field 540.

In one embodiment, the memory 220 may include information of geofences which are respectively appropriate to respective zones where the EV 10 is located, respective moving directions of the EV 10 and/or a combination thereof. The processor 210 reads out a corresponding geofence from the memory 220 based on the determined zone and/or the moving direction of the EV 10.

Figure 7:
FIG. 7 depicts an example mapping table where mapping relationships among a type of an EV, a velocity of the EV and a corresponding geofence are defined according to an exemplary embodiment of the present disclosure.

FIG. 7 depicts an example mapping table where mapping relationships among a moving direction of an EV, a zone where the EV is located and a corresponding geofence are defined according to an exemplary embodiment of the present disclosure. The mapping table 222 may be stored in the memory 220 of the remote management server 20. In one embodiment, the processor 210 may look up the mapping table 222 to determine a corresponding geofence for a given zone and/or the moving direction.

Referring now to FIG. 7, the zones may include zone 1 and zone 2 for each direction A and B, and their corresponding geofences to be determined may be "Geofence A1" and "Geofence A2", respectively, for the moving direction A, and may be "Geofence B1" and "Geofence B2" for the moving direction B which may be opposite to the moving direction A. In some embodiments, the "Geofence A1" can be defined by a geofence function $G_{A1}(x)$, "Geofence A2" can be defined by a geofence function $G_{A2}(x)$, "Geofence B1" can be defined by a geofence function $G_{B1}(x)$, and "Geofence B2" can be defined by a geofence function $G_{B2}(x)$.

Once a specific geofence for an EV 10 is determined, the determined geofence can be combined with a current location of the EV 10 provided with the EV-related data 11 to generate the geofence information 520 of the safety warning signal 500a or 500b. The geofence information 520 may include a geofence function G(x) defined with respect to the current location of the EV 10.

Figure 8A:
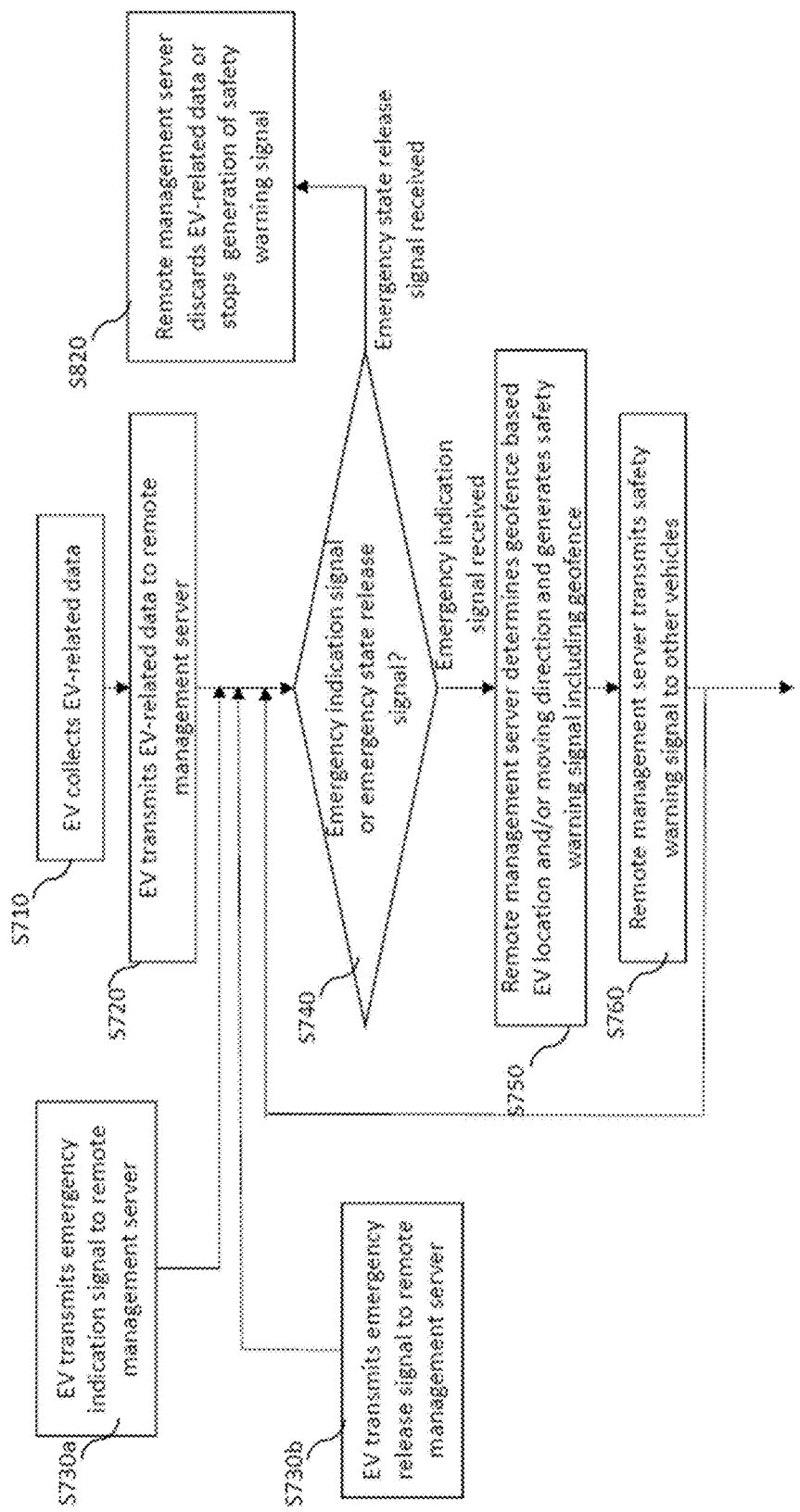
FIGS. 8A and 8B depict a flow chart illustrating a method for providing an EV alert according to an exemplary embodiment of the present disclosure.
Figure 8B:
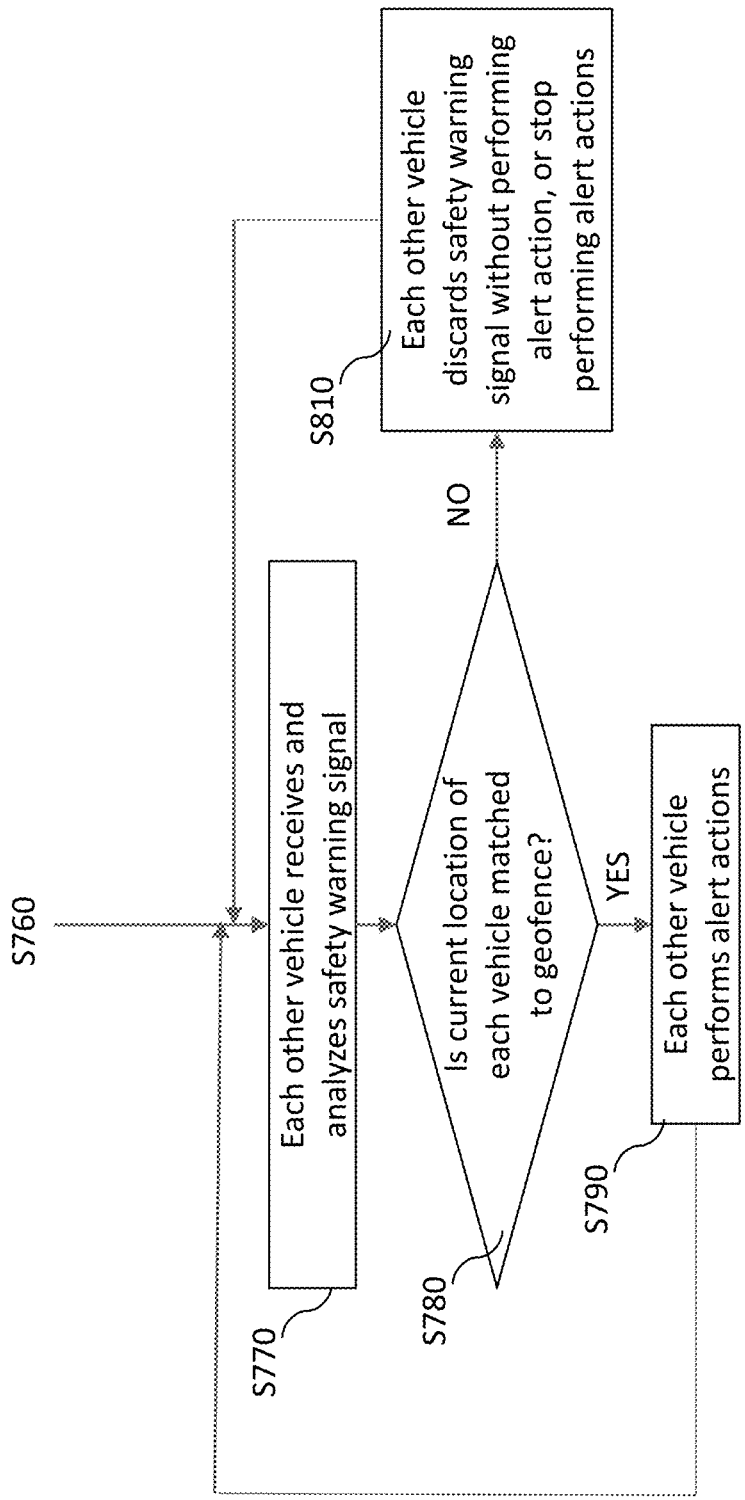

FIGS. 8A and 8B depict a flow chart illustrating a method for providing an EV alert according to an exemplary embodiment of the present disclosure.

Referring now to FIGS. 1, 2A-2C and 8, when the EV 10 is in an emergency state where it heads to an emergency scene, the EV 10 triggers an emergency state and transmits an emergency indication signal 12 to the remote management server 20 via the communication network 15 (S730a). In case the EV 10 is released from the emergency state, or the EV 10 is transitioned to a normal state which is not emergency state, the EV 10 may transmit an emergency release signal 13 to the remote management server 20 (S730b). The emergency state can manually be triggered by an operator of the EV 10 or can automatically be triggered when flashing lights and/or sirens of the EV 10 are activated. In addition, the EV 10 collects EV-related data 11 such as a location, a moving direction, a type, a velocity or the like using the sensor devices 160 (S710) and transmits the EV-related data 11 to the remote management server 20 (S720). In addition, in step S740, the remote management server 20 receives the EV-related data 11, the emergency indication signal 12 and/or the emergency release signal 13. Still in step S740, the remote management server 20 (e.g., processor 210) determines whether the emergency indication signal 12 or the emergency release signal is received. If it is determined that the emergency indication signal 12 is received, the method performs steps S750 to S790 and S810. If it is determined that the emergency release signal 13 is received, the method performs step S820.

In step S750, the remote management server 20 determines a geofence based on the EV location and/or the moving direction, and generates a safety warning signal 500a or 500b including geofence information 520 associated with the geofence.

In one embodiment, the geofence information 520 is directly provided as a set of location coordinates corresponding to a boundary of the determined geofence. In another embodiment, the geofence information 520 is indirectly provided as an indication (e.g., geofence function G(x)) that can be used by the subscriber device 300 to retrieve the geofence from the geofence information 520.

In step S760, the remote management server 20 transmits the safety warning signal 500a or 500b to other vehicles 30a to 30d.

After step S760, the method may repeatedly go to step S740 to determine whether the emergency indication signal 12 is received or the emergency state release signal 13 is received.

In step S770, the subscriber device 300 of each vehicle 30a to 30d receives and analyzes the safety warning signal 500a or 500b to retrieve the geofence.

In step S780, the subscriber device 300 (e.g., processor 310) determines whether a current location of the corresponding vehicle is matched to the geofence (e.g., whether the vehicle current location is located within the geofence). If a match is found between the current location and the geofence (YES), the processor 310 controls the alert-generation device 370 to perform one or more alert actions (S790); otherwise (NO), (e.g., if no match is found therebetween) the processor 310 may discard the safety warning signal 500a or 500b and perform no alert action (S810). After performing steps S790 and/or S810, the method may repeatedly go to step S770 to receive and analyze the safety warning signal 500a or 500b.

Figure 9:
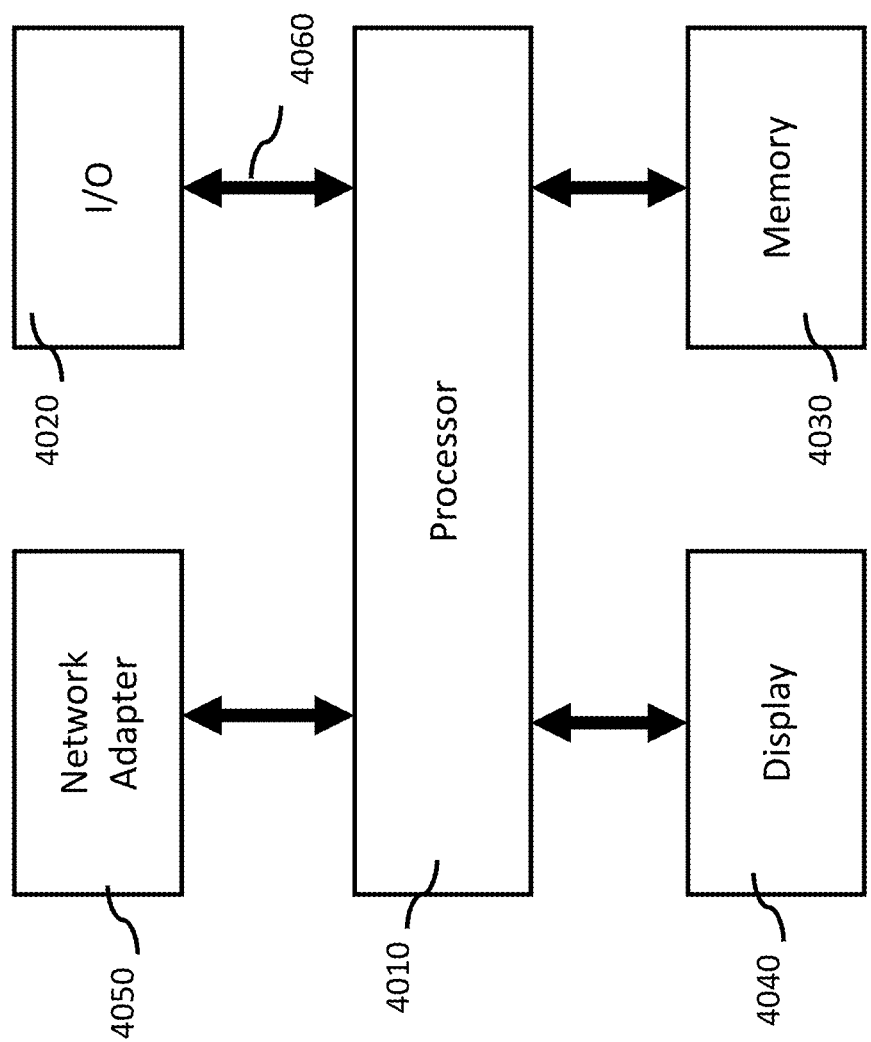
FIG. 9 is a block diagram of a computing system according to an exemplary embodiment of the present disclosure.

FIG. 9 is a block diagram of a computing system 4000 according to an exemplary embodiment of the present disclosure.

Referring to FIG. 9, the computing system 4000 may be used as a platform for performing: the functions or operations described hereinabove with respect to at least one of the emergency subscriber device 100, the remote management server 20 and the subscriber device 300; and the methods described with reference to FIGS. 8A and 8B.

Referring to FIG. 9, the computing system 4000 may include a processor 4010, I/O devices 4020, a memory system 4030, a display device 4040, and/or a network adaptor 4050.

The processor 4010 may drive the I/O devices 4020, the memory system 4030, the display device 4040, and/or the network adaptor 4050 through a bus 4060.

The computing system 4000 may include a program module for performing: the functions or operations described hereinabove with respect to at least one of the emergency subscriber device 100, the remote management server 20 and the subscriber device 300; and the methods described with reference to FIGS. 8A and 8B. For example, the program module may include routines, programs, objects, components, logic, data structures, or the like, for performing particular tasks or implement particular abstract data types. The processor (e.g., 4010) of the computing system 4000 may execute instructions written in the program module to perform: the functions or operations described hereinabove with respect to at least one of the emergency subscriber device 100, the remote management server 20 and the subscriber device 300; and the methods described with reference to FIGS. 8A and 8B. The program module may be programmed into the integrated circuits of the processor (e.g., 4010). In an exemplary embodiment, the program module may be stored in the memory system (e.g., 4030) or in a remote computer system storage media.

The computing system 4000 may include a variety of computing system readable media. Such media may be any available media that is accessible by the computer system (e.g., 4000), and it may include both volatile and non-volatile media, removable and non-removable media.

The memory system (e.g., 4030) can include computer system readable media in the form of volatile memory, such as RAM and/or cache memory or others. The computer system (e.g., 4000) may further include other removable/non-removable, volatile/non-volatile computer system storage media.

The computer system (e.g., 4000) may communicate with one or more devices using the network adapter (e.g., 4050). The network adapter may support wired communications based on Internet, local area network (LAN), wide area network (WAN), or the like, or wireless communications based on code division multiple access (CDMA), global system for mobile communication (GSM), wideband CDMA, CDMA-2000, time division multiple access (TDMA), long term evolution (LTE), wireless LAN, Bluetooth, Zig Bee, or the like.

Exemplary embodiments of the present disclosure may include a system, a method, and/or a non-transitory computer readable storage medium. The non-transitory computer readable storage medium (e.g., the memory system 4030) has computer readable program instructions thereon for causing a processor to carry out aspects of the present disclosure.

The computer readable storage medium can be a tangible device that can retain and store instructions for use by an instruction execution device. The computer readable storage medium may be, for example, but not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EEPROM or Flash memory), a static random access memory (SRAM), a portable compact disc read-only memory (CD-ROM), a digital versatile disk (DVD), a memory stick, a floppy disk, or the like, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to the computing system 4000 from the computer readable storage medium or to an external computer or external storage device via a network. The network may include copper transmission cables, optical transmission fibers, wireless transmission, routers, firewalls, switches, gateway computers and/or edge servers. A network adapter card (e.g., 4050) or network interface in each computing/processing device receives computer readable program instructions from the network and forwards the computer readable program instructions for storage in a computer readable storage medium within the computing system.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the computing system (e.g., 4000) through any type of network, including a LAN or a WAN, or the connection may be made to an external computer (for example, through the Internet using an Internet Service Provider). In an exemplary embodiment, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, system (or device), and computer program products (or computer readable medium). It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The corresponding structures, materials, acts, and equivalents of all means or step plus function elements, if any, in the claims below are intended to include any structure, material, or act for performing the function in combination with other claimed elements as specifically claimed. The description of the present disclosure has been presented for purposes of illustration and description but is not intended to be exhaustive or limited to the present disclosure in the form disclosed. Many modifications and variations will be apparent to those of ordinary skill in the art without departing from the scope and spirit of the present disclosure. The embodiment was chosen and described in order to best explain the principles of the present disclosure and the practical application, and to enable others of ordinary skill in the art to understand the present disclosure for various embodiments with various modifications as are suited to the particular use contemplated.

While the present invention has been particularly shown and described with respect to preferred embodiments thereof, it will be understood by those skilled in the art that the foregoing and other changes in forms and details may be made without departing from the spirit and scope of the present invention. It is therefore intended that the present invention not be limited to the exact forms and details described and illustrated but fall within the scope of the appended claims.

What is claimed is:

1. A system for providing an emergency vehicle (EV) alert, comprising:
   a first device associated with the EV, the first device configured to transmit EV data including a current location of the EV to a management server; and
   the management server configured to:
      receive the EV data from the first device;
      determine a geofence for the EV at least based on the received EV data and geographical map data near the EV; and
      transmit the determined geofence to a second device associated with another vehicle;
   wherein the management server comprises a processor, to determine the geofence, the processor is configured to:
      receive the geographical map data from a storage device;
      define at least one zone on a map rendered using the geographical map data;
      determine a zone, among the at least one zone, to which the current location of the EV belongs; and
      determine the geofence based on the determined zone on the map, and
   wherein the at least one zone comprises a first zone and a second zone separated along with a forward direction of the EV, and the first zone and the second zone are separately defined at least based on whether a road on which the EV travels has a median strip.

2. The system of claim 1, wherein the second device configured to:
   receive the geofence;
   determine a location of the another vehicle with respect to the geofence; and
   perform one or more alert actions based on the determined location of the another vehicle with respect to the received geofence.

3. The system of claim 1, wherein the storage device is included or locally connected to the management server or is installed at a remote location in communication with the management server.

4. The system of claim 1, wherein when the road has the median strip, in the first zone with the median strip, the determined geofence is defined to exclude one or more opposite lanes over the median strip, and in the second zone without the median strip, the determined geofence is defined to include the opposite lanes.

5. The system of claim 1, wherein the management server is configured to determine the geofence further based on a moving direction of a vehicle.

6. The system of claim 1, wherein when the determined zone includes an underpass or overpass crossing a road over which the EV travels, the determined geofence is defined to exclude the underpass or overpass.

7. The system of claim 1, wherein when the determined zone includes a parallel lane isolated from a lane over which the EV travels, the determined geofence is defined to exclude the isolated parallel lane.

8. A system for providing an emergency vehicle (EV) alert, comprising:
   a first device associated with the EV, the first device configured to transmit EV data including a current location of the EV to a management server; and
   the management server configured to:
      receive the EV data from the first device;
      determine a geofence for the EV at least based on the received EV data and geographical map data near the EV; and
      transmit the determined geofence to a second device associated with another vehicle,
   wherein the management server comprises a processor, to determine the geofence, the processor is configured to:
      receive the geographical map data from a storage device;
      define at least one zone on a map rendered using the geographical map data;
      determine a zone, among the at least one zone, to which the current location of the EV belongs; and
      determine the geofence based on the determined zone on the map, and
   wherein the at least one zone comprises a first zone and a second zone, and the first zone and the second zone are separately defined at least based on whether there is at least one another road allowing a vehicle traffic flow into or from a road on which the EV travels.

9. The system of claim 8, wherein the second device configured to:
   receive the geofence;
   determine a location of the another vehicle with respect to the geofence; and
   perform one or more alert actions based on the determined location of the another vehicle with respect to the received geofence.

10. The system of claim 8, wherein the storage device is included or locally connected to the management server or is installed at a remote location in communication with the management server.

11. The system of claim 8, wherein in the first zone where there is no at least one another road allowing the vehicle traffic flow into or from the road, the determined geofence is defined to have a first size,
   wherein in the second zone, there is the at least one another road allowing the vehicle traffic flow into or from the road, the determined geofence is defined to have a second size greater than the first size in a perpendicular direction to a forward direction of the EV, and wherein the second size is such that the geofence covers a portion of the at least one another road.

12. The system of claim 8, wherein the management server is configured to determine the geofence further based on a moving direction of a vehicle.

13. The system of claim 8, wherein when the determined zone includes an underpass or overpass crossing a road over which the EV travels, the determined geofence is defined to exclude the underpass or overpass.

14. The system of claim 8, wherein when the determined zone includes a parallel lane isolated from a lane over which the EV travels, the determined geofence is defined to exclude the isolated parallel lane.

15. A system for providing an emergency vehicle (EV) alert, comprising:
- a first device associated with the EV, the first device configured to transmit EV data including a current location of the EV to a management server; and
- the management server configured to:
  - receive the EV data from the first device;
  - determine a geofence for the EV at least based on the received EV data and geographical map data near the EV; and
  - transmit the determined geofence to a second device associated with another vehicle,
- wherein the management server comprises a processor, to determine the geofence, the processor is configured to:
  - receive the geographical map data from a storage device;
  - define at least one zone on a map rendered using the geographical map data;
  - determine a zone, among the at least one zone, to which the current location of the EV belongs; and
  - determine the geofence based on the determined zone on the map, and
- wherein when the determined zone includes an underpass or overpass crossing a road over which the EV travels, the determined geofence is defined to exclude the underpass or overpass.

16. The system of claim 15, wherein the second device configured to:
- receive the geofence;
- determine a location of the another vehicle with respect to the geofence; and
- perform one or more alert actions based on the determined location of the another vehicle with respect to the received geofence.

17. The system of claim 15, wherein the storage device is included or locally connected to the management server or is installed at a remote location in communication with the management server.

18. The system of claim 15, wherein the management server is configured to determine the geofence further based on a moving direction of a vehicle.

19. The system of claim 15, wherein the management server is configured to determine the geofence further based on a moving direction of a vehicle.

20. The system of claim 15, wherein when the determined zone includes an underpass or overpass crossing a road over which the EV travels, the determined geofence is defined to exclude the underpass or overpass.

* * * * *